(12) United States Patent
Zheng

(10) Patent No.: US 9,091,885 B1
(45) Date of Patent: Jul. 28, 2015

(54) METHOD AND APPARATUS FOR MANUFACTURING CURVED LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventor: Hua Zheng, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/375,741

(22) PCT Filed: Apr. 30, 2014

(86) PCT No.: PCT/CN2014/076588
§ 371 (c)(1),
(2) Date: Jul. 30, 2014

(30) Foreign Application Priority Data

Apr. 24, 2014 (CN) .................. 2014 1 0169755.4

(51) Int. Cl.
*H01J 9/00* (2006.01)
*H01J 9/24* (2006.01)
*G02F 1/1337* (2006.01)
*G02F 1/13* (2006.01)
(52) U.S. Cl.
CPC ............ *G02F 1/1337* (2013.01); *G02F 1/1303* (2013.01); *G02F 1/133788* (2013.01)

(58) Field of Classification Search
CPC ............ G02F 1/133711; G02F 1/1334; G02F 1/133753; G02F 1/133788; G02F 1/1333
USPC ........... 445/3, 24, 63; 349/123, 124, 134, 136
See application file for complete search history.

(56) References Cited

U.S. PATENT DOCUMENTS

| | | | |
|---|---|---|---|
| 6,203,866 B1 * | 3/2001 | Mochizuki et al. ............ | 428/1.1 |
| 6,512,569 B1 * | 1/2003 | Acosta et al. ................. | 349/181 |
| 7,749,575 B2 * | 7/2010 | Kataoka et al. ................ | 428/1.1 |
| 2003/0067575 A1 * | 4/2003 | Acosta et al. ................. | 349/123 |
| 2004/0191428 A1 * | 9/2004 | Tsuda et al. ................... | 428/1.3 |
| 2011/0128487 A1 * | 6/2011 | Kim .............................. | 349/123 |
| 2011/0261295 A1 * | 10/2011 | Kim ................................ | 349/96 |
| 2012/0212697 A1 * | 8/2012 | Miyakawa et al. ........... | 349/123 |
| 2012/0242941 A1 * | 9/2012 | Suwa et al. .................... | 349/123 |
| 2013/0337716 A1 * | 12/2013 | Wang et al. ....................... | 445/3 |
| 2014/0002781 A1 * | 1/2014 | Chien et al. ................... | 349/123 |
| 2015/0077662 A1 * | 3/2015 | Pugh et al. ...................... | 349/13 |

* cited by examiner

*Primary Examiner* — Thomas A Hollweg
*Assistant Examiner* — Kevin Quarterman
(74) *Attorney, Agent, or Firm* — Stein IP, LLC

(57) ABSTRACT

The present disclosure relates to a method and an apparatus for manufacturing a curved liquid crystal display. The method includes: step a) providing a box body which is filled with liquid crystals and packaged; step b) curving the box body; and step c) polymerizing the liquid crystals at the inner surface of a first substrate and the liquid crystals at the inner surface of a second substrate in the box body respectively, so as to form respective pre-tilt angles corresponding to each other. The liquid crystal display obtained in this manner will present no abnormal dark fringes, so that the display quality of the liquid crystal display is improved.

15 Claims, 3 Drawing Sheets

METHOD AND APPARATUS FOR MANUFACTURING CURVED LIQUID CRYSTAL DISPLAY

FIELD OF THE INVENTION

The present disclosure relates to the field of liquid crystal display, in particular to a method for manufacturing a curved liquid crystal display and an apparatus for manufacturing the curved liquid crystal display.

BACKGROUND OF THE INVENTION

A liquid crystal display, with the advantages of lightweight, thinness and the like, gradually becomes one of fastest developed display devices. In some special application fields, for example, when an advertising display device is desirable to be mounted on an arc-shaped wall, a curved liquid crystal display is always needed.

In the prior art, a curved liquid crystal display is generally obtained through directly bending a flat panel display as required. However, when the curved liquid crystal display obtained in this manner displays pictures, abnormal dark fringes will appear, so that the display quality of the liquid crystal display is greatly affected.

Therefore, a curved liquid crystal display without abnormal dark fringes is needed.

SUMMARY OF THE INVENTION

Aiming at the above-mentioned problem, the present disclosure proposes a method for manufacturing a curved liquid crystal display. The curved liquid crystal display obtained in this manner will suffer no abnormal dark fringes, so that the display quality of the curved liquid crystal display is improved.

According to a first aspect of the present disclosure, proposed is a method for manufacturing a curved liquid crystal display, including: step a) providing a box body which is filled with liquid crystals and packaged; step b) curving the box body; and step c) polymerizing the liquid crystals at the inner surface of a first substrate and the liquid crystals at the inner surface of a second substrate in the box body respectively, so as to form respective pre-tilt angles corresponding to each other.

According to the method of the present disclosure, the box body filled with the liquid crystals is curved first, and then the liquid crystals in the box body is formed with respective pre-tilt angles. In this manner, it can be ensured that the pre-tilt angles subsequently formed by the liquid crystals at the inner surface of the first substrate may correspond to the pre-tilt angles subsequently formed by the liquid crystals at the inner surface of the second substrate respectively. Through the respective pre-tilt angles corresponding to each other, the liquid crystal display thus obtained will not present abnormal dark fringes during operation, so that the display quality of the liquid crystal display is improved. In addition, the liquid crystals in the box body may be driven to flow by curving the box body filled with the liquid crystals, so that the liquid crystals can be uniformly distributed in the curved box body, thus further improving the display quality.

In an embodiment, in step b), a curing platform including a clamping member for fixing the box body and a curving member for curving the box body is used for curving the box body. In an embodiment, the motion precision of the curving member is between 0.5 and 2 mm. Preferably, the motion precision of the curving member is 1 mm. In this manner, the motion precision of the curving members is controlled to be so low that the box body may be prevented from being damaged due to sudden excessive deformation.

In an embodiment, the curing platform further includes a top wall above the clamping member and the curving member, and an ultraviolet light source is arranged in the top wall. In this way, in step c), the liquid crystals are polymerized respectively through ultraviolet irradiation, so as to form respective pre-tilt angles corresponding to each other. In another embodiment, the curing platform further includes a power supply assembly and a heating assembly, wherein the power supply assembly is configured to realize alignment of the liquid crystals in the box body before they are polymerized respectively to form respective pre-tilt angles corresponding to each other, and the heating assembly is configured to maintain the respective pre-tilt angles of the liquid crystals. Through arranging the power supply assembly, the ultraviolet light source, the heating assembly and the above-mentioned clamping member and curving member in the curing platform, the packaged box body can be formed into a curved box body at one time in the curing platform, without other manufacturing steps or other apparatuses. Therefore, the production process is greatly simplified, and the production efficiency is improved.

In an embodiment, the clamping member fixes a pair of opposite side edges of the box body, and the curving member drives the other pair of opposite side edges of the box body to move, so that the box body is curved away from the top wall. By means of which, all positions in the box body may be irradiated by the ultraviolet light source located in the top wall all the time without being shaded. Thus the liquid crystals at all positions at the inner surface of the first substrate and at the inner surface of the second substrate may form the respective pre-tilt angles corresponding to each other, so that abnormal dark fringes can be avoided. In a specific embodiment, the box body is oblong, and two clamping members fix two opposite side edges of the box body respectively, while two curving members drive the other two side edges of the box body to move, so that the box body is curved away from the top wall.

According to a second aspect of the present disclosure, proposed is an apparatus for implementing the above-mentioned method for manufacturing the curved liquid crystal display. The apparatus includes a curing platform, which includes a clamping member for fixing a box body, a curving member for curving the box body, a power supply assembly, an ultraviolet light source and a heating assembly, wherein the power supply assembly is configured to realize alignment of liquid crystals in the box body, the ultraviolet light source is configured to enable the liquid crystals at the inner surface of a first substrate and the liquid crystals at the inner surface of a second substrate to be polymerized respectively to form respective pre-tilt angles corresponding to each other, and the heating assembly is configured to maintain the liquid crystals at the respective pre-tilt angles. This curing platform includes the clamping member, the curving member, the power supply assembly, the ultraviolet light source and the heating assembly, so that the packaged box body may be formed into a curved box body at one time in the curing platform, without other manufacturing steps or other apparatuses. Therefore, the production process is greatly simplified, and the production efficiency is improved.

Compared with the prior art, the present disclosure has the following advantages. According to the method of the present disclosure, the box body filled with the liquid crystals is curved, ensuring that the pre-tilt angles subsequently formed by the liquid crystals at the inner surface of the first substrate correspond to the pre-tilt angles subsequently formed by the liquid crystals at the inner surface of the second substrate respectively. Therefore, the liquid crystal display thus obtained does not present abnormal dark fringes during operation, thus improving the display quality of the liquid crystal display. In addition, when the box body filled with the liquid crystals is curved, the liquid crystals in the box body may be driven to flow, so that the liquid crystals can be uniformly distributed in the curved box body, and the display quality is also beneficially improved. Moreover, the clamping member, the curving member, the power supply assembly, the ultraviolet light source and the heating assembly are all arranged in the curing platform, so that the packaged box body may be formed into a curved box body at one time in the curing platform, without other manufacturing steps or other apparatuses. Consequently, the production process is greatly simplified, and the production efficiency is improved.

BRIEF DESCRIPTION OF THE DRAWINGS

The present disclosure will be described in more detail below based on embodiments with reference to accompanying drawings. In the drawings.

In the accompanying drawings, the same components are indicated by the same reference signs. The accompanying drawings are not drawn to actual scale.

DETAILED DESCRIPTION OF THE EMBODIMENTS

The present disclosure will be further illustrated below in combination with the accompanying drawings.

Figure 1:
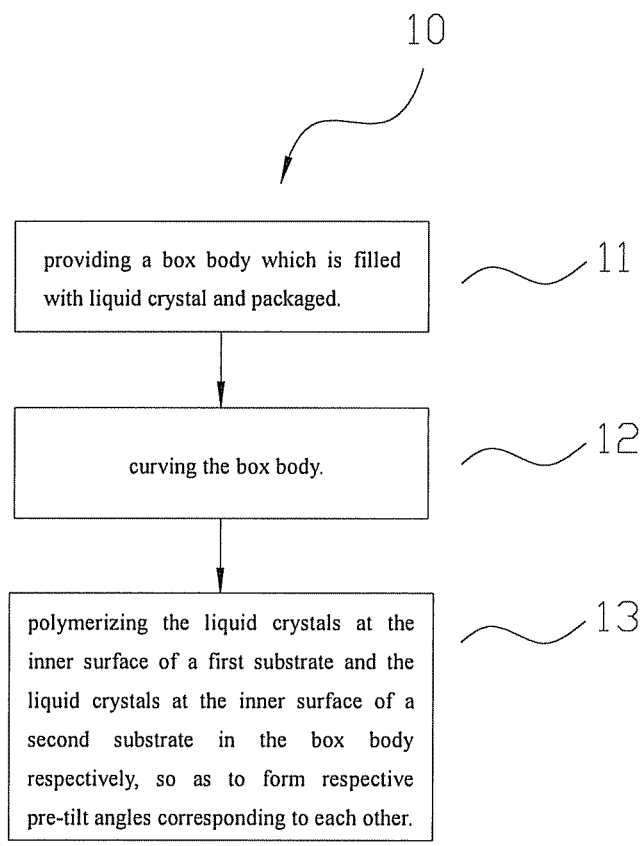
FIG. 1 is a flow chart of implementing a method according to the present disclosure.

FIG. 1 shows a flow chart of implementing a method 10 for manufacturing a curved liquid crystal display according to the present disclosure, including the following steps:

step 11: providing a box body which is filled with liquid crystal and packaged, step 12: curving the box body, step 13: polymerizing the liquid crystals at the inner surface of a first substrate and the liquid crystals at the inner surface of a second substrate in the box body respectively, so as to form respective pre-tilt angles corresponding to each other.

According to the present disclosure, the box body may be obtained through using the first substrate and the second substrate first, then filling the box body with liquid crystals, and then packaging the box body. Both the first substrate and the second substrate used herein are glass substrates, each having a thickness of 0.1-0.7 mm, which are dedicated to the field of liquid crystal display. Such glass substrates have relatively high flexibility, so that the box body made of the glass substrates can be curved. In an embodiment, the first substrate may be a color filter substrate, and the second substrate may be an array substrate. By processing the liquid crystals in the box body, the liquid crystals can be polymerized in the box body, and are tilted relative to the first substrate and the second substrate so as to form respective pre-tilt angles. Both the glass substrate and the pre-tilt angle are well known by those skilled in the art. Thus for the purpose of conciseness, they are not redundantly introduced herein.

Figure 2:
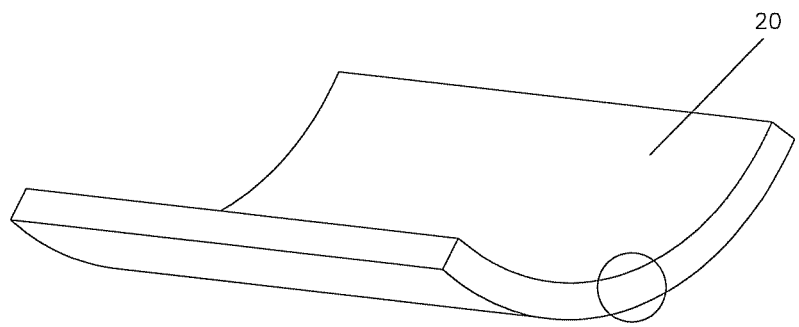
FIG. 2 is a structural schematic diagram of a curved box body of a curved liquid crystal display according to the present disclosure.
Figure 3:
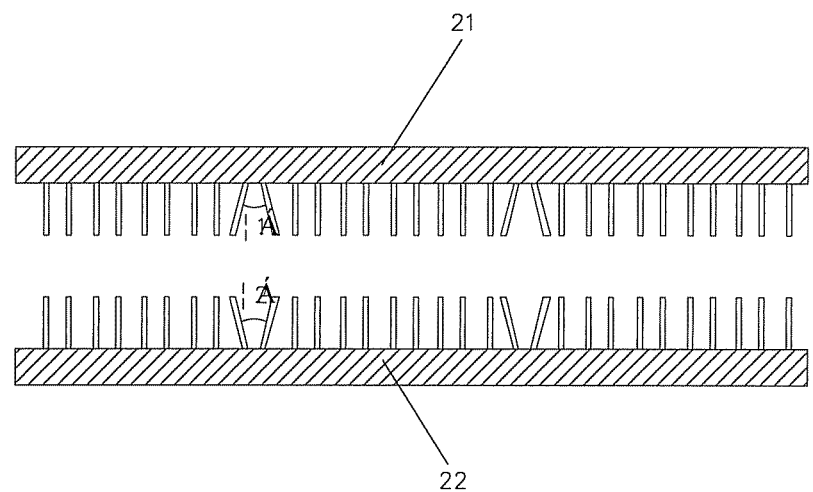
FIG. 3 is an amplified view of part I in FIG. 2.

As shown in FIG. 2 and FIG. 3, in a curved box body 20 of a curved liquid crystal display manufactured through the method according to the present disclosure, the pre-tilt angle $\alpha 1$ formed by the liquid crystals at the inner surface of the first substrate 21 corresponds to the pre-tilt angle $\alpha 2$ formed by the liquid crystals at the inner surface of the second substrate 22, so that no abnormal dark fringes will appear during operation of the liquid crystal display, and thus the display quality of the liquid crystal display is improved. In addition, since the liquid crystal is a fluid with relatively high viscosity, the liquid crystals in the box body may be driven to flow by curving the box body 20 filled with the liquid crystals, so that the liquid crystals can be uniformly distributed in the curved box body 20, which further improves the display quality of the liquid crystal display.

Figure 4:
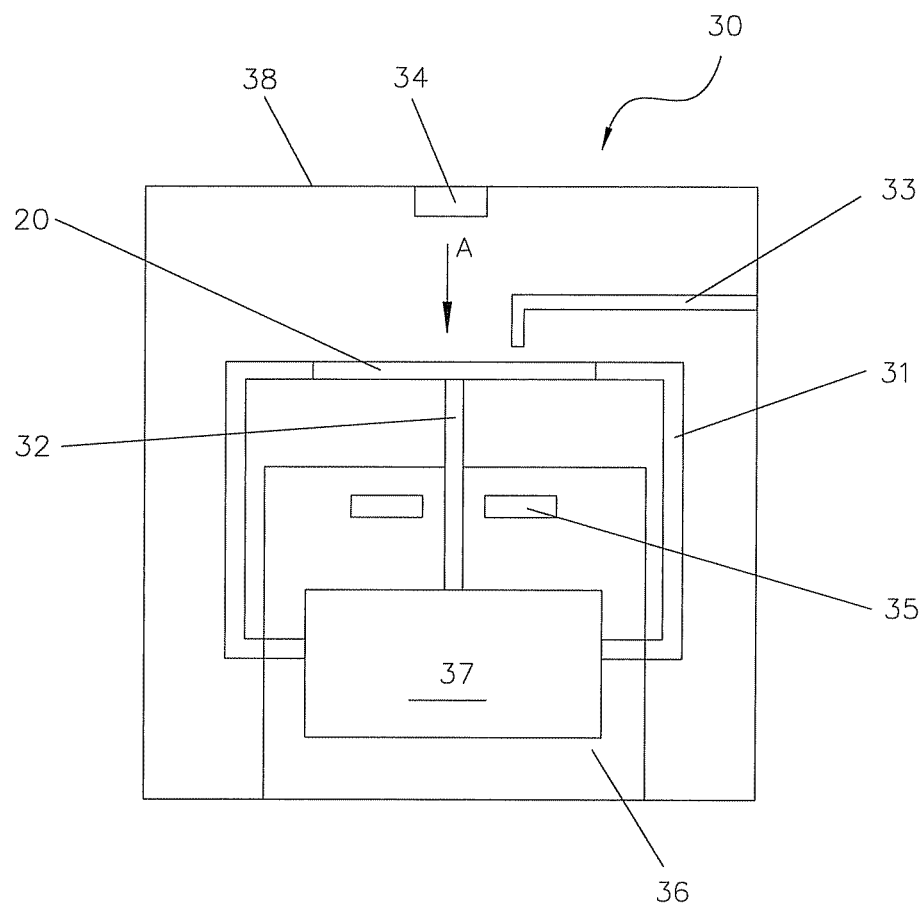
FIG. 4 is a structural schematic diagram of a curing platform according to the present disclosure.

To conveniently curve the box body 20, a curing platform 30 is further creatively provided. FIG. 4 schematically shows the curing platform 30. The curing platform 30 includes a clamping member 31, a curving member 32, a power supply assembly 33, a top wall 38 with an ultraviolet light source 34, and a heating assembly 35. This curing platform 30 can be used for curving the box body 20 which is filled with the liquid crystal and then packaged, so as to form the pre-tilt angles as above-mentioned, without other manufacturing steps or other apparatuses. Therefore, the production process is greatly simplified, and the production efficiency is improved. Each component of the curing platform 30 will be described in detail below. Although FIG. 4 shows the curing platform 30 in a shape of a box body, the curing platform 30 may be dispersed with side walls, but is merely provided with the top wall 38 including the ultraviolet light source 34 in practice.

As shown in FIG. 4, an operating table 36 with a motor 37 therein is further arranged in the curing platform 30. The clamping member 31 and the curving member 32 are driven by the motor 37, the operating end of which is located above the operating table 36. Although FIG. 4 shows that the operating table 36 is arranged in the curing platform 30, the operating table 36 may not be provided in practice, and the motor 37 may also be substituted by other driving devices, such as a hydraulic device. The clamping member 31 is configured to fix the box body 20, and the curving member 32 is configured to curve the box body 20.

Figure 5:
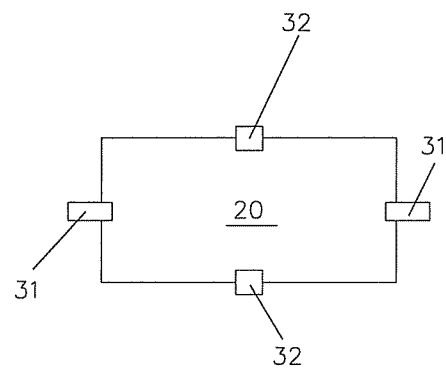
FIG. 5 is an A-directional view of FIG. 4.
Figure 6:
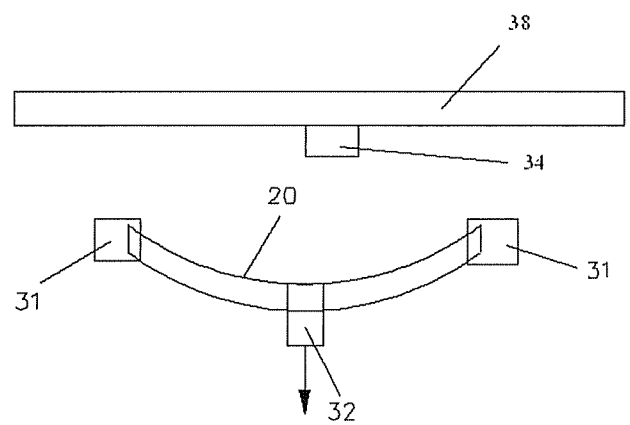
FIG. 6 and FIG. 7 show two methods of curving a box body.
Figure 7:
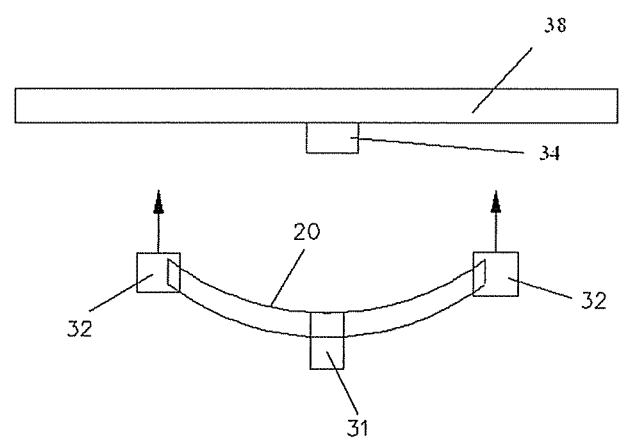

The box body 20 is generally in a planar oblong shape. The quantity of the clamping members 31 can be two, and the two clamping members 31 are arranged oppositely. The quantity of the curving members 32 can be also two, and the two curving members 32 are also arranged oppositely. In practical production, the two clamping members 31 fix two opposite side edges of the box body 20 respectively, and the two curving members 32 clamp the central areas of the other two side edges of the box body 20, as shown in FIG. 5. Under the drive of the motor 37, the two curving members 32 moves away from the top wall 38 (or the ultraviolet light source 34), and the two clamping members 31 keep still (as shown by the arrow in FIG. 6), so that the box body 20 is curved away from the top wall 38 (or the ultraviolet light source 34). The two curving members 32 may also move towards the top wall 38 (or the ultraviolet light source 34), and the two clamping members 31 keep still (as shown by arrows in FIG. 7), so that the box body 20 is curved away from the top wall 38 (or the ultraviolet light source 34).

To prevent the box body 20 from being damaged due to excessively quick curving, the motion precision of the curving members 32 is controlled within a range from 0.5 mm to 2 mm. Preferably, the motion precision thereof is 1 mm.

After the box body 20 is curved, a direct current voltage or an alternating current voltage is applied between the first substrate 21 and the second substrate 22 of the box body 20. Under the action of the voltage, the liquid crystals in the box body 20 are slowly aligned, and simultaneously move to the inner surface of the first substrate 21 and the inner surface of the second substrate 22. In an embodiment, the applied voltage is 30V. The voltage can be applied in such a manner that, the voltage is boosted from 0V to 30V for 15 seconds to 1 minute; and then the voltage of 30V is kept for 30 seconds to 10 minutes.

Then, the box body 20 is irradiated by ultraviolet light from the ultraviolet light source 34, so that the aligned liquid crystals are polymerized at the inner surface of the first substrate 21 and at the inner surface of the second substrate 22, so as to form respective pre-tilt angles corresponding to each other. In an embodiment, the ultraviolet irradiation lasts 30 seconds to 10 minutes. Because the box body 20 is curved away from the ultraviolet light source 34, all areas of the box body 20 can be irradiated by the ultraviolet light without being shaded. Thus it is ensured that the liquid crystals at all positions of the inner surface of the first substrate 21 and the inner surface of the second substrate 22 may form respective pre-tilt angles corresponding to each other. Therefore, abnormal dark fringes present during operation of the liquid crystal display can be avoided.

Subsequently, the box body 20 is heated through the heating assembly 35, so that the polymerized liquid crystals can maintain the pre-tilt angles even if the voltage is removed. The heating assembly 35 may be any device capable of emitting heat energy, such as a resistance wire, an infrared heater, and the like. In an embodiment, the temperature of heating the box body 20 is 40° C., and the heating time is 30 seconds to 10 minutes.

Although the present disclosure has been described with reference to the preferred embodiments, various modifications may be made to it and components therein may be replaced with equivalents without departing from the scope of the present disclosure. Particularly, as long as structural conflicts do not exist, the technical features mentioned in the embodiments may be combined in a random manner. The present disclosure is not limited to the specific embodiments disclosed herein, but includes all technical solutions falling within the scope of the claims.

The invention claimed is:

1. A method for manufacturing a curved liquid crystal display, including:
   step a) providing a box body which is filled with liquid crystals and packaged;
   step b) curving the box body; and
   step c) polymerizing the liquid crystals at the inner surface of a first substrate and the liquid crystals at the inner surface of a second substrate in the curved box body respectively, so as to form respective pre-tilt angles corresponding to each other.

2. The method according to claim 1, wherein in step c), the liquid crystals are polymerized respectively through ultraviolet irradiation, so as to form respective pre-tilt angles corresponding to each other.

3. The method according to claim 1, wherein in step b), a curing platform including a clamping member for fixing the box body and a curving member for curving the box body is used for curving the box body.

4. The method according to claim 3, wherein the curing platform further includes a power supply assembly and a heating assembly, wherein the power supply assembly is configured to realize alignment of the liquid crystals in the box body before they are polymerized respectively to form respective pre-tilt angles corresponding to each other, and the heating assembly is configured to maintain said respective pre-tilt angles of the liquid crystals.

5. The method according to claim 3, wherein the curing platform further includes a top wall above the clamping member and the curving member, and an ultraviolet light source is arranged in the top wall.

6. The method according to claim 5, wherein the curing platform further includes a power supply assembly and a heating assembly, wherein the power supply assembly is configured to realize alignment of the liquid crystals in the box body before they are polymerized respectively to form respective pre-tilt angles corresponding to each other, and the heating assembly is configured to maintain said respective pre-tilt angles of the liquid crystals.

7. The method according to claim 6, wherein the clamping member fixes a pair of opposite side edges of the box body, and the curving member drives the other pair of opposite side edges of the box body to move, so that the box body is curved away from the top wall.

8. The method according to claim 7, wherein the curing platform further includes a power supply assembly and a heating assembly, wherein the power supply assembly is configured to realize alignment of the liquid crystals in the box body before they are polymerized respectively to form respective pre-tilt angles corresponding to each other, and the heating assembly is configured to maintain said respective pre-tilt angles of the liquid crystals.

9. The method according to claim 7, wherein the box body is oblong, and two clamping members fix two opposite side edges of the box body respectively, while two curving members drive the other two side edges of the box body to move, so that the box body is curved away from the top wall.

10. The method according to claim 9, wherein the curing platform further includes a power supply assembly and a heating assembly, wherein the power supply assembly is configured to realize alignment of the liquid crystals in the box body before they are polymerized respectively to form respective pre-tilt angles corresponding to each other, and the heating assembly is configured to maintain said respective pre-tilt angles of the liquid crystals.

11. The method according to claim 7, wherein the motion precision of the curving member is between 0.5 and 2 mm.

12. The method according to claim 11, wherein the curing platform further includes a power supply assembly and a heating assembly, wherein the power supply assembly is configured to realize alignment of the liquid crystals in the box body before they are polymerized respectively to form respective pre-tilt angles corresponding to each other, and the heating assembly is configured to maintain said respective pre-tilt angles of the liquid crystals.

13. The method according to claim 11, wherein the motion precision of the curving member is 1 mm.

14. The method according to claim 13, wherein the curing platform further includes a power supply assembly and a heating assembly, wherein the power supply assembly is configured to realize alignment of the liquid crystals in the box body before they are polymerized respectively to form respective pre-tilt angles corresponding to each other, and the heating assembly is configured to maintain said respective pre-tilt angles of the liquid crystals.

15. An apparatus for manufacturing a curved liquid crystal display through a method, the method including:

step a) providing a box body which is filled with liquid crystals and packaged;

step b) curving the box body; and step c) polymerizing the liquid crystals at the inner surface of a first substrate and the liquid crystals at the inner surface of a second substrate in the box body respectively, so as to form respective pre-tilt angles corresponding to each other, wherein the apparatus includes a curing platform, which includes a clamping member for fixing the box body, a curving member for curving the box body, a power supply assembly, an ultraviolet light source and a heating assembly, and wherein the power supply assembly is configured to realize alignment of liquid crystals in the box body, the ultraviolet light source is configured to enable the liquid crystals at the inner surface of a first substrate and the liquid crystals at the inner surface of a second substrate to be polymerized respectively to form respective pre-tilt angles corresponding to each other, and the heating assembly is configured to maintain the liquid crystals at said respective pre-tilt angles.

\* \* \* \* \*